US006622912B2

(12) United States Patent
Tejedor Ruiz

(10) Patent No.: US 6,622,912 B2
(45) Date of Patent: Sep. 23, 2003

(54) ELECTRONIC LOCKING SYSTEM FOR CONTROL OF ACCESS

(75) Inventor: Jose Agustin Tejedor Ruiz, Vizcaya (ES)

(73) Assignee: Talleres de Escoriaza, S.A., Guipuzcoa (ES)

( * ) Notice: Subject to any disclaimer, the term of this patent is extended or adjusted under 35 U.S.C. 154(b) by 0 days.

(21) Appl. No.: 10/207,561

(22) Filed: Jul. 29, 2002

(65) Prior Publication Data

US 2003/0102372 A1 Jun. 5, 2003

(30) Foreign Application Priority Data

Aug. 3, 2001 (ES) .......................................... 200101832

(51) Int. Cl.[7] .................................................. G06K 5/00
(52) U.S. Cl. ....................................... 235/382; 235/375
(58) Field of Search ................................ 235/382, 380, 235/382.5, 375

(56) References Cited

U.S. PATENT DOCUMENTS 3,906,447 A 9/1975 Crafton .................. 340/149 A
4,519,228 A 5/1985 Sornes ........................ 70/276
4,811,012 A * 3/1989 Rollins ............................ 3/89
5,508,691 A * 4/1996 Castleman et al. ...... 235/382.5
5,815,557 A * 9/1998 Larson ....................... 235/382
5,923,264 A * 7/1999 Lavelle et al. .............. 235/375
5,933,086 A * 8/1999 Tischendorf et al. .. 340/825.31

* cited by examiner

*Primary Examiner*—Daniel St. Cyr
(74) *Attorney, Agent, or Firm*—Nields & Lemack

(57) ABSTRACT

Electronic locking system for the control of access, which is composed of the following elements: a physical device capable of storing a user code and an order code which represents the time at which said device is issued and optionally capable of storing zone codes which represent the zones accessible by said device and a physical device in which the information contained is stored in a coded form according to a coding algorithm and a secret code which is different for each installation, an electromechanical locking system which controls access to the zones, issuers for the devices capable of storing information in the users' devices, information which is stored in a coded form according to a coding algorithm and a secret code which is different for each installation, programmers capable of transferring information to the electronic circuits of the doors, a computer which manages the entire installation and is responsible for sending information to the users' device issuers and to the programmers of the door modules.

6 Claims, 1 Drawing Sheet

ELECTRONIC LOCKING SYSTEM FOR CONTROL OF ACCESS

FIELD OF THE INVENTION

The present invention refers to the electronic locks for controlling access to enclosed areas to a limited number of persons.

BACKGROUND OF THE INVENTION

Electronic locking systems are widely used for controlling access to enclosed areas to a limited number of persons.

Conventional mechanical locks do not resolve the problem of the loss of keys and the deactivation of the same in a simple and versatile manner.

There exist on the market numerous electronic locking systems which use different devices (cards or electronic keys, etc.), in which the device lost by a user can be deactivated in a simple manner, issuing a new device to that user. When the lock reads that device, it automatically invalidates the previous device and accepts the new device as valid.

Tor Somes' U.S. Pat. No. 4,519,228 ("Electronic recodeable lock") describes an electronic lock which uses a perforated card with a magnetic strip. A recoding command is stored in the magnetic strip and indicates that the access code for the lock should be changed to the code of the perforated card.

What is inconvenient about this solution is the high cost of the mixed card (perforated and magnetic) as compared to solutions which use a standard magnetic card.

Crafton's U.S. Pat. No. 3,906,447 ("Security system for lock and key protected secure areas") describes a security system for areas controlled by electronic locks in which each user has a device (perforated or magnetic card, etc.). In order to access a restricted area, the lock must read the user's device. Each lock and each user's device stores a code. When the code of the device read by the lock matches a code stored in its memory, access to the restricted area is permitted by the lock. In each user's device an order code is also stored, which represents a time. This time coincides with the moment at which each device is issued. The lock compares the device's order code with the time stored in the lock at the moment the user's device is read. If the order code of the device is higher than the time store in the lock at the moment the device is read, the lock stores the device's code as a new code, invalidating the previous code of the device. The system described in this patent is composed of a unit dedicated to coding the user's devices. This unit has the means to store a counter which represents a time, and the means to advance this counter at regular intervals. The lock has means to store a counter which represents a time in a similar manner. The user's device also stores a code which represents the time at which its access to the door expires. The lock automatically invalidates the device's code once the time stored by the lock coincides with the expiration time of the device.

The fundamental disadvantage of this system is that it is necessary to maintain a permanent synchronization between the internal time of the locks and the time of the issuers of the devices. If for any reason these two times are not synchronized, the system stops working or functions incorrectly.

Another disadvantage is that it is only possible to store one device code per lock, so it is not possible for two users with different devices to access the door.

Another inconvenient feature of the invention is that each lock must have additional space in its memory to store the expiration time of the device in addition to the device code.

Juan Imedio's ES Patent No. 532,333 ("New programmable electronic lock") describes an electronic lock which consists of a card which stores a code which is composed of a card code and a sequential code. When the card code read by a lock coincides with the code stored by the lock, access to the area restricted by the lock is permitted. If the card code is higher than the code stored in the lock by one unit, the previous code is invalidated and the new card code is stored.

Juan Imedio's ES Patent No. 92-02,223 ("New programmable electronic lock") describes an electronic lock which uses cards and is based on the previous Patent No. 532,333 by the same person. The fundamental difference with the previous patent is that if the card code is higher than the code stored in the lock by one or more units, the previous code is invalidated and the new card code is stored.

The fundamental inconvenience of this type of system is that the sequential code of the locks only advances if the new users insert their devices in the locks. Frequently the advancement of the sequential codes of the locks is only permitted if the difference between the card code and the sequential code stored in the lock is not greater than a maximum value. If this is not the case, access to the lock is not permitted. For this reason, if new devices are issued and these do not access a lock (for example a low traffic access such as an emergency exit), the lock does not advance its stored sequential codes and loses synchronization with the codes of the newly issued devices, making it necessary to resynchronize the lock with an external means in the case in which the new devices are issued with a code which is higher than the maximum value stored in the lock.

Another inconvenience of this system is the complexity of creating user devices in advance. At times it is necessary to issue devices which will be valid at a time later than the date of issue of the device. The method used in these cases consists in assigning a sequential code which is several units higher rather than assigning the following sequential code. This method is not satisfactory given that it is not possible to know in advance the number of devices which will be issued before the device assigned in advance is read by the lock. In the case in which the number of devices issued is greater than the number of devices anticipated before the device issued in advance, the latter will not be valid as its sequential code will not lower than that stored in the lock at that time, and it will be necessary to resynchronize the lock with an external means.

Another inconvenience of this system is the complexity of issuing user devices from locations which are distant from each other. Given that it is necessary to know at all times the sequential code stored in the locks, at the time of issuing a new device, it becomes necessary to have a means by which to extract said code or maintain a synchronized copy of the same at each location where devices are issued. This implies the necessity of exchanging information frequently through some system of communication of data, which implies a higher cost and complexity.

SUMMARY OF THE INVENTION

The subject of the present invention is a security system which takes as a reference Crafton's U.S. Pat. No. 3,906,447 ("Security system for lock and key protected secured areas").

This system permits the control of access of the users of an installation to certain areas, and is composed of the following elements:

- A physical device capable of storing a user code and an order code which represents the time at which said device is issued and optionally capable of storing zone codes which represent the zones accessible by said device and a physical device in which the information contained is stored in a coded form according to a coding algorithm and a secret code which is different for each installation,
- An electromechanical locking system which controls access to the zones,
- Issuers for the devices capable of storing information in the devices of the Users, information which is stored in a coded form according to a coding algorithm and a secret code which is different for each installation,
- Programmers capable of transferring information to the electronic circuits of the doors,
- A computer which manages the entire installation and is responsible for sending information to the users' device issuers and to the programmers of the door modules.

The electromechanical locking system is constituted by the following elements:

- An electronic circuit which generates an electronic signal to release the electromechanical control system,
- A reader module or modules capable of reading the information contained in the users' devices,
- An electromechanical control system governed by an electrical signal capable of controlling access to an area.

The principal advantages of the system described are:

- It is not necessary to maintain synchronous functioning between the time counter of the lock and that of the device issuer.
- The need to have some kind of communication between the remotely located device issuers is eliminated. It is only necessary that their time counters be synchronized. These time counters can be synchronized with the normal hourly time, which is a simple and universal form of synchronization.

The electronic circuits cannot lose synchronization with the devices issued as a new device accesses a permitted area whenever it issues a later order code.

DESCRIPTION OF A PREFERRED EMBODIMENT

Figure 1:
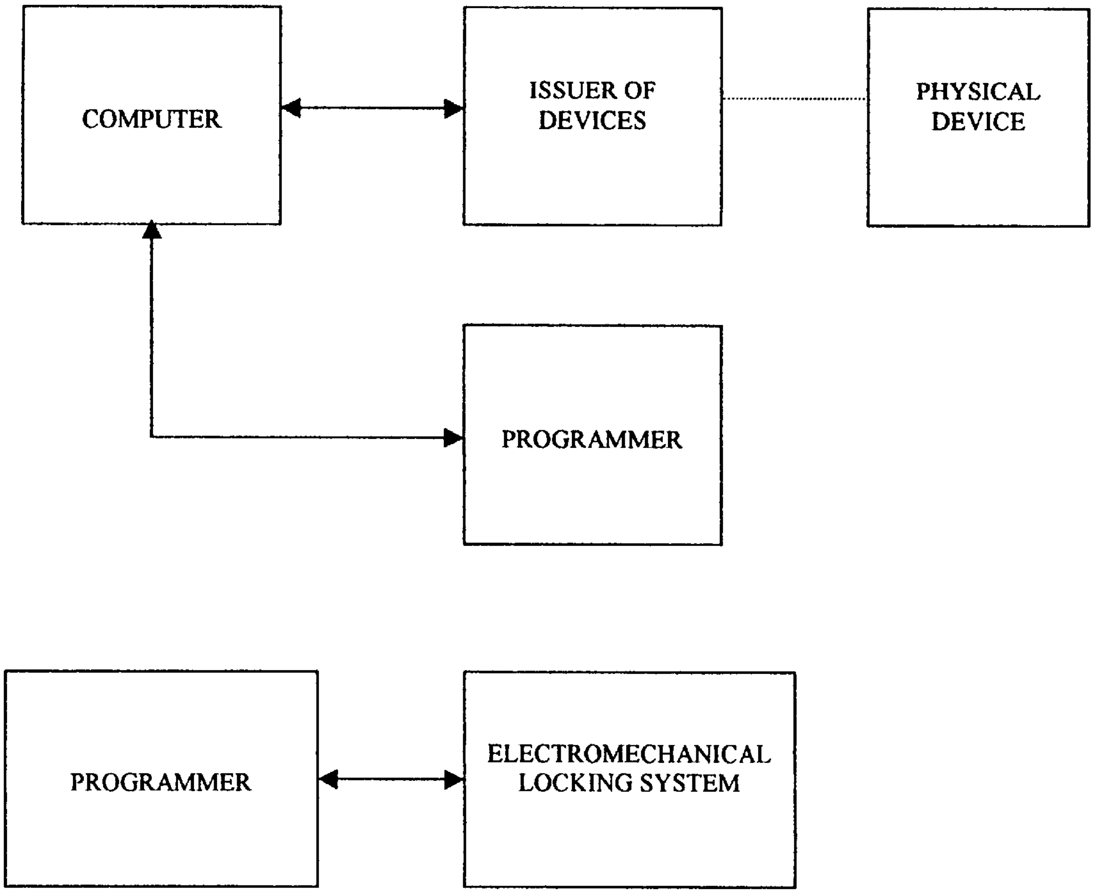
FIG. 1 is a block diagram illustrating the security system of the present invention.

Installations for control of access can be classified as a function of the type of users who access the zones. Thus, we have two types of installations:

- Installations in which the users who access the installation change frequently. In these installations, it is convenient to have a simple way of canceling old users without having to reprogram the locks. Likewise, it is necessary to have a method for permitting access to certain areas without having to reprogram the locks. Examples of these types of installations would be universities, elderly housing, etc.
- Installations in which the users who access the installation do not change frequently. In these installations it is convenient to have a simple method of modifying the conditions for access to the areas without having to reprogram the user devices. Examples of this type of installation would be offices, factories, etc.

In addition, there are installations in which both types of users coexist, and for which it is necessary to have a system which solves both problems. Examples of this type of installation would be hotels, museums, etc. to which some users access have infrequent access (clients, visitors) while others have frequent access (cleaning personnel, guards, etc.).

The proposed system permits the control of a system for control of access in which there exist both users with a high frequency of change and users with a low frequency of change.

The system is composed of the following elements, as shown in FIG. 1:

- Physical devices capable of storing information about the users. Each user has one of these devices. These devices can be of various types (magnetic cards, electronic keys, cards with a contact chip, radio frequency remote controls, chip cards with contacts, etc.),
- An electromechanical control system governed by an electrical signal capable of controlling access to an area,
- Readers capable of reading the information contained in the users' devices,
- Electronic circuits capable of storing information about the user devices,
- An electronic circuit which stores information about the devices which access the area.

Each user has one of the devices which stores that user's information. When a user wishes to access an area, he presents his device to the reader of the control system associated with a restricted area. The reader of the control system reads the information in the device and transfers it to the electronic control module. This module verifies the validity of the device. If access of the device is permitted in this area, the electronic module sends an electrical signal to the control system, allowing access to the area.

User device

| User code | Order code | Zone A code | Zone B code | ........ ...... | Zone Z code |
|---|---|---|---|---|---|

Memory of the electronic module

Zone code

| | |
|---|---|
| User code 1 | Order code 1 |
| User code 2 | Order code 2 |
| .......................... | ....................... |
| User code N | Order code N |

Each device stores a user code which identifies it. Each electronic circuit associated with an area stores a list with the user codes of those who are permitted to have access to that area. The electronic circuit compares the user code stored in the device with the user codes stored in the memory of the circuit. If one of these user codes matches the user code of the device read, the electronic module then compares the order code.

In each device there is an order code stored which represents the moment the device was issued. The list of users stored in the electronic control modules also contains the order code of each device. Once the device has been read and the user code has been verified, the order code stored in the device is compared with the order code corresponding to that device which is stored in the electronic module. If the order code for that device matches the order code corresponding to that device which is stored in the electronic module, the electronic module permits access to the restricted area, releasing the electromechanical control system. If the order code of the device is later than the order code corresponding to that device which is stored in the electronic module, the previously stored code is replaced by the new order code from the device read, thus invalidating the devices issued prior to the device read.

This system permits the removal of access of a device to an area simply by issuing the user a new device and presenting the device to the reader associated with that area.

The user information is stored in the device in a coded form according to the coding algorithm which generates a random sequence as a function of the information stored in the device and a secret key which depends on each installation. The information contained in the device in coded form can only be interpreted if both the coding algorithm and the secret code are known. In this manner we avoid the possibility that devices issued at one installation may be read by the readers of a different installation. The coding algorithm can be any of those which are widely used in communications systems (DES, 3DES, RSA, etc.).

The fundamental improvement in the present system with respect to Crafton is that in the electronic circuit which controls the access to an area, various user codes are stored along with their respective order codes, which permits the access of various devices to said area. Another improvement with respect to Crafton's patent is that the order code received from the device is stored in the electronic circuit. In this manner, the order codes of the devices are not compared with the time at which the reader reads the information contained in the device, rather said order code is compared with the last order code stored for this device in the electronic module. Using this method it is not necessary to have perfect synchronization between the time counter of the issuer of devices and the time counter of the electronic circuit. In fact, it would not be necessary to provide a time counter in the electronic circuits which control access to the areas, which results in a lower cost and a reduction of the space in said circuits.

Optionally, a list of areas accessible to the user can be stored in the device. This list is created when the device is issued, and in this manner it is possible to determine at the time the device is issued which areas will be accessible to the user. This method is used for an installation in which the users have a high frequency of change. The modification of the conditions of access of these users is done by issuing a new device and storing said information in the device, rather than reprogramming the electronic modules.

The user codes remain constant during the issuing of new devices and are used to register the operations performed by the devices. As it is not necessary to change the user codes, fewer combinations are needed in order to prevent the repetition of said codes, and thus the amount of memory needed to store said codes is reduced.

The use of the time at which the devices are issued as a means of invalidating old devices implies that whenever a new device is issued with access permitted to an area, we can be sure that it will be valid and will cancel the previous devices. There are no problems related to the synchronization of the order code stored in the newly issued device and those stored in the electronic modules which control access to the areas, regardless of the number of devices issued previously.

What is claimed is:

1. An electronic locking system for control of access, which allows the control of access of a user of an installation to certain areas, comprising the following elements:

at least one physical device capable of storing a user code and an order code which represents the time at which said device is issued and optionally capable of storing zone codes which represent the zones accessible by said device, said user code and said order code being stored in a coded form according to a coding algorithm and a secret code which is different for each installation, an electromechanical locking system which controls access to said zones, said electromechanical locking system comprising electronic circuits, issuers of said at least one physical device which are capable of storing information in said at least one physical device, said information being stored in a coded form according to a coding algorithm and a secret key which is different for each installation, programmers capable of transferring information to said electronic circuits, and a computer which manages the system and is responsible for sending information to said physical device issuers and to said programmers.

2. The electronic locking system for the control of access, according to claim 1, wherein said electronic circuit generates an electronic signal to release said electromechanical locking system capable of controlling access to an area, and wherein said electromechanical locking system further comprises:

a reader module or modules capable of reading the information contained in said at least one physical device.

3. The electronic locking system for the control of access, according to claim 2, wherein said electronic circuit of said electromechanical locking system further comprises the following elements:

a means for storing data, and a counter which advances at predetermined, regular intervals and a means to compare data received from said at least one physical device with the data stored in said electronic circuit.

4. The electronic locking system for the control of access, according to claim 3, wherein said electronic circuit uses said means for storing data to store its zone code, a list of user codes and their corresponding order codes.

5. The electronic locking system for control of access, according to claim 3, wherein in the electronic circuit, said means for comparison is used to compare the user code contained in the device with each of the user codes stored in the memory of said circuit and to emit an electrical signal in the case in which the device code and the order code corresponding to the device matches one of the device codes and its order codes stored in memory.

6. The electronic locking system for control of access, according to claim 3, wherein in the electronic circuit, said means for comparison is used to compare the order code of a device with the order code of one of the devices stored in the memory of said circuit, and also to store in said memory the order code of the device read as a new order code for this device, in the case in which the order code of the device is later than the order code for that device stored in the memory of the circuit.

* * * * *